(12) United States Patent
Thendral et al.

(10) Patent No.: US 12,322,053 B2
(45) Date of Patent: Jun. 3, 2025

(54) METAVERSE ENABLED DIGITAL COGNITIVE TWIN

(71) Applicant: Bank of America Corporation, Charlotte, NC (US)

(72) Inventors: Thamizh Thendral, Chennai (IN); Anurajam Rajagopalan, Chennai (IN); Durga Prasad Kutthumolu, Hyderabad (IN); Pracheta Ranjan Mohanty, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 310 days.

(21) Appl. No.: 18/095,059

(22) Filed: Jan. 10, 2023

(65) Prior Publication Data

US 2024/0233280 A1    Jul. 11, 2024

(51) Int. Cl.
*G06N 3/094* (2023.01)
*G06N 3/0475* (2023.01)
*G06Q 10/067* (2023.01)
*G06T 19/00* (2011.01)

(52) U.S. Cl.
CPC ......... *G06T 19/006* (2013.01); *G06N 3/0475* (2023.01); *G06N 3/094* (2023.01); *G06Q 10/067* (2013.01)

(58) Field of Classification Search
CPC .... G06T 19/006; G06N 3/094; G06N 3/0475; G06Q 10/067
USPC ........................................................ 345/633
See application file for complete search history.

(56) References Cited

U.S. PATENT DOCUMENTS

| | | | |
|---|---|---|---|
| 11,238,350 B2 | 2/2022 | Cormier et al. | |
| 11,582,424 B1* | 2/2023 | Kasaba | G06V 40/28 |
| 2008/0038707 A1 | 2/2008 | Banhazl et al. | |
| 2021/0392106 A1 | 12/2021 | Rajeev et al. | |
| 2022/0116208 A1* | 4/2022 | Stapleton | H04L 9/0631 |
| 2022/0124140 A1* | 4/2022 | Okina | G06V 40/20 |
| 2022/0163960 A1 | 5/2022 | Cella et al. | |
| 2023/0109377 A1* | 4/2023 | Arechiga | G06N 5/047 |
| | | | 345/419 |
| 2024/0112674 A1* | 4/2024 | Nguyen | G06F 3/167 |

* cited by examiner

*Primary Examiner* — Jin Ge
(74) *Attorney, Agent, or Firm* — Weiss & Arons LLP

(57) ABSTRACT

Systems, methods, and apparatus are provided for developing and applying a metaverse enabled digital cognitive twin. Customer communications may be secured at a data layer using multi-cloud object storage. A first multi-modal AI system may generate segmented customer activity data from the customer communications and output the segmented customer activity data to a set of decentralized streaming caches. At an extended reality platform, a second multi-modal AI system may generate immersive content from a real time customer input and the segmented customer activity data for viewing in an XR environment. The system may train an XR avatar based at least in part on the customer communications. The XR avatar may interact with customers and agents and may present a video together with customized supplementary information. The immersive video and the XR avatar may be generated by a plug-in application configured to adapt a variety of XR platforms.

20 Claims, 6 Drawing Sheets

METAVERSE ENABLED DIGITAL COGNITIVE TWIN

FIELD OF TECHNOLOGY

Aspects of the disclosure relate to metaverse interactions.

BACKGROUND OF THE DISCLOSURE

A customer may with enterprise communicate representatives across a variety of digital channels. For example, a customer may communicate via email, text, internet-based chat, chat within a mobile application, social media posting, telephone, or videoconferencing. In each of these mediums, interactions may involve an interactive response system or a live agent.

An enterprise may seek to continually improve interactions with customers. However, it may be technically challenging to identify and assimilate this vast range of communication data. Another technical challenge involves applying the data to ongoing customer interactions with both live agents and digitally generated agents (bots).

It would be desirable to use a first multi-modal artificial intelligence (AI) framework to integrate unstructured customer interaction data from multiple channels in different formats into classified customer activity that could be input to a predictive model.

It would be desirable to use a second multi-modal AI framework to develop (1) immersive content based on the classified customer activity and (2) a digital cognitive twin that simulates live agent capabilities and is integrated with the immersive content. It would be desirable to invoke the digital twin for customer interactions in an extended reality environment such as a metaverse environment.

The term extended reality (XR) may encompass all types of digitally enhanced perception, including augmented reality (AR), mixed reality (MR), and the completely immersive virtual reality (VR). Customers may interact with both live and digital agents in various XR modalities.

The metaverse is a virtual shared space that is accessed via the internet. In its broadest form, the metaverse may encompass the entire social and economic structure that exists in both the actual and virtual worlds. Avatars, content, and goods may all travel around freely.

In the metaverse, a virtual world experience may be created by simulating human emotions and gestures. Individuals in the metaverse may communicate and transact with each other and with digital 3D items. It would be desirable to design a plug-in that can apply the customer interaction data in an immersive environment on a variety of metaverse platforms.

SUMMARY OF THE DISCLOSURE

Systems, methods, and apparatus are provided for developing and applying a metaverse enabled digital cognitive twin.

Customer communications may be secured at a data layer using multi-cloud object storage. A first multi-modal AI system may generate segmented customer activity data from the customer communications and output the segmented customer activity data to a set of decentralized streaming caches.

At an extended reality platform, a second multi-modal AI system may generate a video from a real-time customer input and the segmented customer activity data for viewing in an XR environment. The system may use a three-dimensional generative adversarial network to train an XR avatar based at least in part on the customer communications. The XR avatar may identify a problem associated with a real-time customer input and, in response, present the video to the customer in the XR environment. The XR avatar may present customized commentary to the customer viewing the video in the XR environment.

The XR avatar may present the video to an enterprise executive in the XR environment. The XR avatar may present a business plan to the enterprise executive based at least in part on the video content.

The immersive video and the XR avatar may be generated by a plug-in application configured to adapt to a variety of XR platforms.

The invention is a practical application that integrates customer interaction data in different data structures across an omnichannel framework and outputs segmented data to decentralized streaming caches. A plug-in application works across multiple XR platforms to generate immersive content from the segmented data using a combination of AI technologies. The application may also use AI technologies to generate an XR avatar trained using the customer interaction data. The XR avatar may interact with the immersive content and with a live customer.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
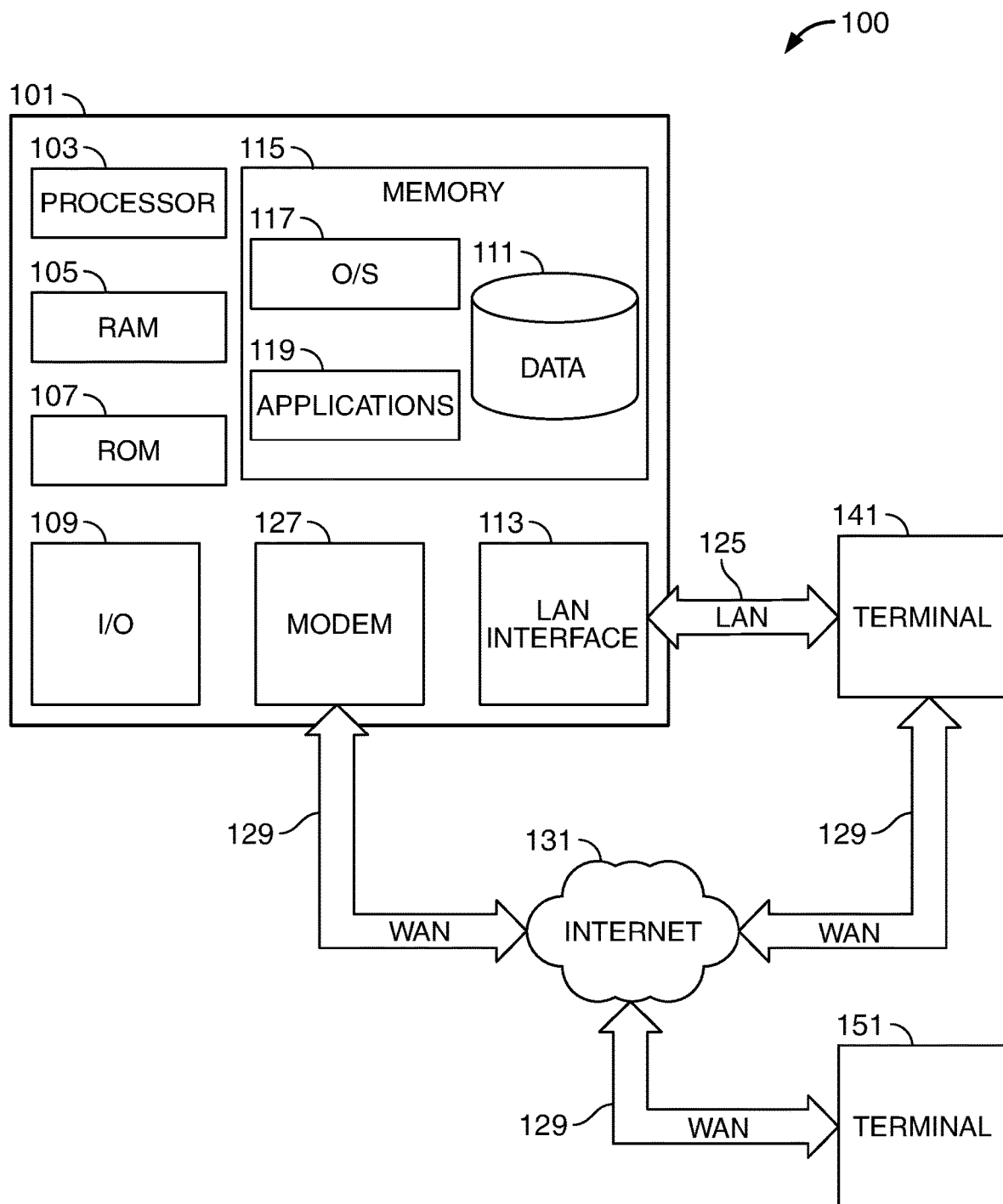
FIG. 1 shows illustrative apparatus in accordance with principles of the disclosure.

Systems, methods, and apparatus are provided for developing and applying a metaverse enabled digital cognitive twin.

For the sake of illustration, the invention will be described as being performed by a "system." The system may include one or more features of apparatus and methods that are described herein and/or any other suitable device or approach.

The system may include a source layer. Customer interactions with an enterprise may involve customer inputs to a variety of channels. For example, a customer may interact via text using a chat function or an email. A customer may interact verbally by speaking to an agent or to an interactive voice response (IVR) system. A customer may interact with an agent by videoconference or may post images or video on social media.

An omnichannel approach may enable the enterprise to provide an integrated experience across multiple channels. Illustrative multi-channel or omnichannel inputs may include unstructured data such as video footage, voice data, electronic messages, social media postings, or scanned data. Unstructured data arrives without predefined fields. The inputs may also include semi-structured, or structured data.

The system may include a first set of database connectors. Omnichannel data mapping may integrate the disparate source data into a unified format. A first set of database connectors may function as a pipeline to map the source layer to an integrated data layer which forms a cohesive platform for a data repository.

The system may include a data layer. The data layer may include cloud-based object storage. Object storage provides many advantages over block storage and file storage, as it is easily scalable and efficient. Objects may include customer interaction input data. Object storage is particularly well suited for unstructured data such as text, documents, images, audio, video. Storage nodes may contain and manage individual buckets holding object data and metadata along with a unique identifier for the bucket address. Multi-cloud object storage may include a unified portfolio of cross-cloud platform services that enable the system to choose a cloud based on the workload to provide consistent infrastructure.

The data layer may incorporate quantum key distribution to secure the input. Quantum key distribution is a secure communication method that implements a cryptographic protocol using quantum mechanics. Quantum superpositions and quantum entanglement enable transmission of information in quantum states to detect eavesdropping. The quantum key distribution may use BBM92 entanglement-based protocol or any suitable protocol.

The system may include a first application program interface (API). The first API may support a set of functions that link the data layer with a first multi-modal AI framework. The first multi-modal AI framework may classify patterns of customer interactions across channels.

Cognitive AI may involve systems that integrate multiple modalities. Multi-modal systems may synthesize the meaning of language, images, video, and structured knowledge sources using data fusion algorithms together with machine learning inference technologies. Multi-modal systems may combine deep learning solutions including natural language processing, image recognition, machine learning based classification. Multi-modal systems may learn to connect objects or concepts across modalities to simulate human cognition and decision-making. Illustrative components may include image description generation, text-to-image generation, visual question answering, image-to-text search, and video-language modeling.

The system may include a first multi-modal AI framework. The first AI framework may mine the inputs from the data layer to identify patterns in customer interactions. The multi-modal framework may include deep learning, neural networks, natural language processing (NLP), speech and object recognition, robotic process automation, and/or any suitable machine learning modes.

The system may include multiple decentralized streaming caches. The system may output segmented customer activity data into decentralized streaming caches. Each cache may function as a separate datastore in a decentralized ecosystem. The streaming caches may act as a high-performance memory system for fast data access by balancing multiple streams. The streaming caches may function as a datastore for inputs to a second multi-modal AI model.

A first illustrative customer activity segment may include complex buying activity. In complex buying activity, a customer may proceed through a series of choices and evaluations before a purchase decision. For example, purchase of a house may include decisions about whether to buy or rent, optimal location, type of house, cost of renovations, and selection of specific finishes. Cache data may include the level of research, extent of shopping history, and steps in the decision-making process.

A second illustrative segment may include dissonance-reducing buying activity. Post-purchase dissonance may occur when a customer regrets a buying choice such as a selected brand. Dissonance is reduced when a customer feels more satisfied post-purchase after comparing the purchase to what they intended to buy. Cache data may include complaints or social media postings related to a past purchase.

A third illustrative segment may include habitual buying activity. Habitual buying activity is a pattern of activity that repeats itself over time. Illustrative patterns may include a purchase at a particular location on a particular day of the week irrespective of alternative brand options. Cache data may include patterns of activity and recurring selections.

A fourth illustrative segment may include variety seeking buying activity. In variety seeking buying activity, a customer may purchase more items when they see a wider variety of products. Cache data may include connections between purchases of similar items across multiple brands.

The system may include a second API. The second API may support the second multi-modal AI framework. The second API may include a set of functions developed to interact with the streaming caches. The system may include a second set of database connectors. The second set of database connectors may link the unified data from the data layer to the second API. The second set of database connectors may link new customer inputs to the second API.

The system may include a second multi-modal AI framework. The second AI framework may be trained using historical customer activity to anticipate problems and generate potential solutions. The model may be highly adaptive and contextual. The learning model may simulate multiple parallel processes capturing multifaceted phenomena and making predictions for complex tasks.

The second AI model may be trained to generate immersive content. The immersive content may be an animated immersive video. The video may address a problem that arises in customer interactions along with anticipated solutions. The video may be generated using a DALL-E2™ neural network, by Open AI, L.P. DALL-E2 is a transformer language model which generates video from natural language text. The video may be generated in response to a customer input.

Spatial computing may be applied to generate an immersive experience in which the video is presented in a three-dimensional digital environment. Three-dimensional model engineering algorithms may create a precise and controlled working model of the environment. In some embodiments, the videos may be presented in a mixed reality system that blends an immersive platform with the mixed reality videos.

A three-dimensional generative adversarial network (3D-GAN) may be applied to generate a digital agent avatar within the metaverse environment. The avatar may function as a digital cognitive twin with the capability to advise customers and employees. Digital twin cognition is a computation form that simulates real-world processes using AI in real time. Developing a cognitive digital twin requires computing the status, behaviors, and relevant interrelated models of real-world elements in digital environments.

The avatar may be trained using customer interaction data inputs from the data layer. The avatar may be trained with input from agents identified as top agents. The avatar may be trained using the immersive videos generated by the AI framework. Multi-modal AI may enable the avatar to make connections between the video and other customer activity data. The avatar may connect the video with learned agent skills for addressing customer complaints. The avatar may connect two or more different videos to comprehensively address customer issues.

The immersive video may be applied in a customer facing scenario. The avatar may interact with the customer around presentation of the animated video to supplement the content with related information. The avatar may interact with the customer around presentation of the animated video to point out aspects of the video that directly relate to a customer query or concern. The avatar may provide customized commentary during presentation of the video. The avatar may speed up or skip portions of the video that are not relevant to the customer.

The avatar may interact directly with a customer in a mixed reality framework. The avatar may interact with a virtual representation of the customer such as a customer avatar.

The immersive video may be applied in an agent facing scenario. For example, the videos may be presented to enterprise agents for guidance in future customer interactions. The videos may be presented to executives for guidance in setting customer policies. The avatar may draw conclusions from customer input and suggest a business plan based on the input. The avatar may combine data from multiple customer inputs to identify a business trend. The avatar may present a video or portions of a video to illustrate the trend.

The system may function as a plug-in that can be added to a variety of XR platforms. The system may enable a user to customize a standard XR platform with digital twin architecture.

One or more non-transitory computer-readable media storing computer-executable instructions are provided. When executed by a processor on a computer system, the instructions perform a method for generating a metaverse enabled digital twin using a set of multi-modal AI systems.

The method may include securing customer communications at a data layer in multi-cloud object storage.

The method may include, at a first multi-modal AI system, generating segmented customer activity data from the customer communications and outputting the segmented customer activity data to a plurality of decentralized streaming caches.

The method may include, at an XR platform including a second multi-modal AI system, generating a video based on a real-time customer input and the segmented customer activity data for viewing in an XR environment and training an XR avatar based at least in part on the customer communications. The XR avatar may be configured to identify a problem associated with a customer input, present the video to the customer in the XR environment, and present customized commentary to the video to the customer viewing the video in the XR environment. The video may involve a solution for the problem.

The immersive video and the XR avatar may be generated at a plug-in application configured to interact with multiple different XR platforms.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touch-sensitive screen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and an associated database.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129 but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP, and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone, or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of natural language processing, image description generation, text-to-image generation, visual question answering, image-to-text search, and video-language modeling, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCS, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
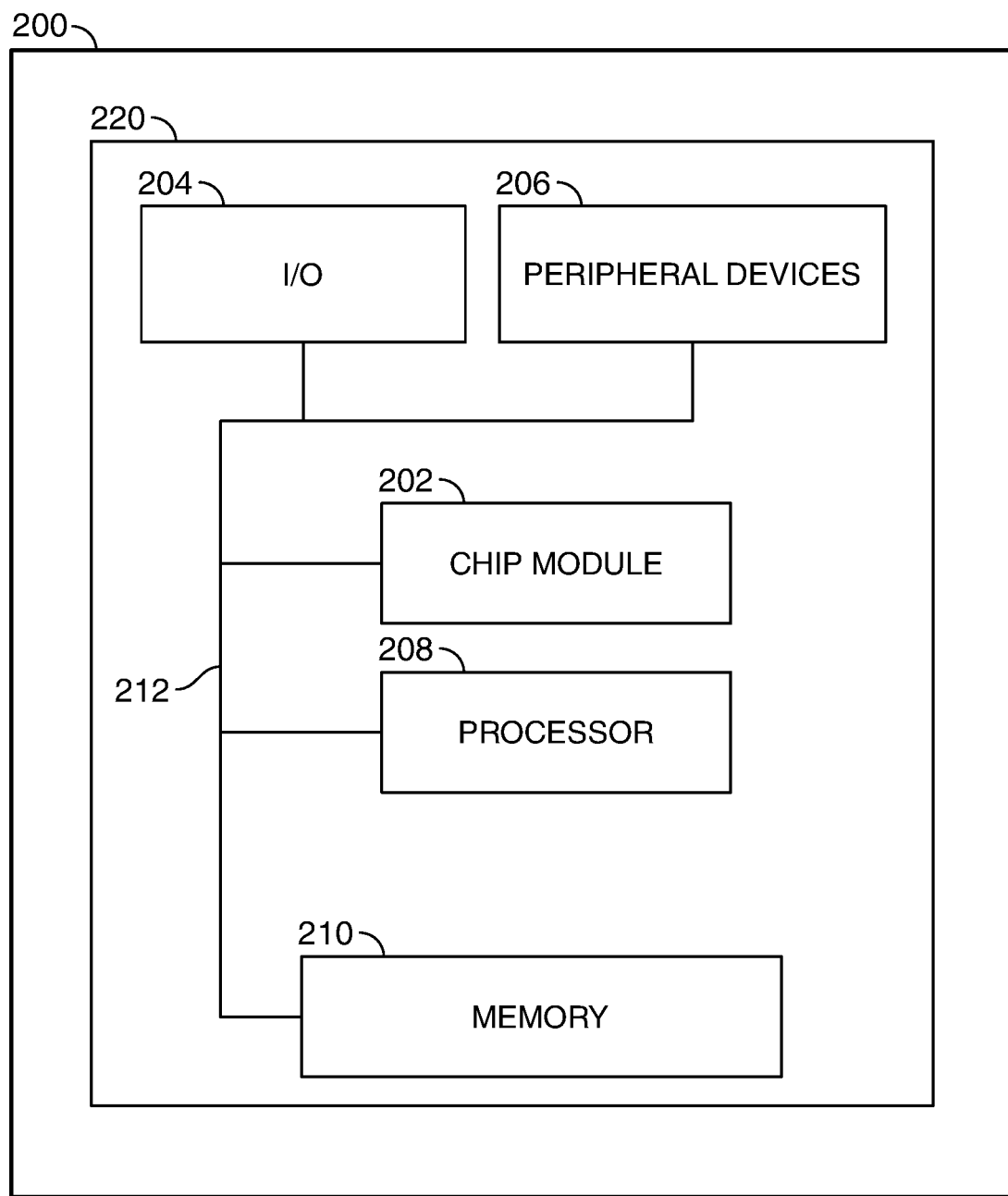
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may perform natural language processing, image description generation, text-to-image generation, visual question answering, image-to-text search, and video-language modeling and other methods described herein; and machine-readable memory 210.

Machine-readable memory 210 may be configured to store in machine-readable data structures: customer communications, segmented customer activity and data, any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
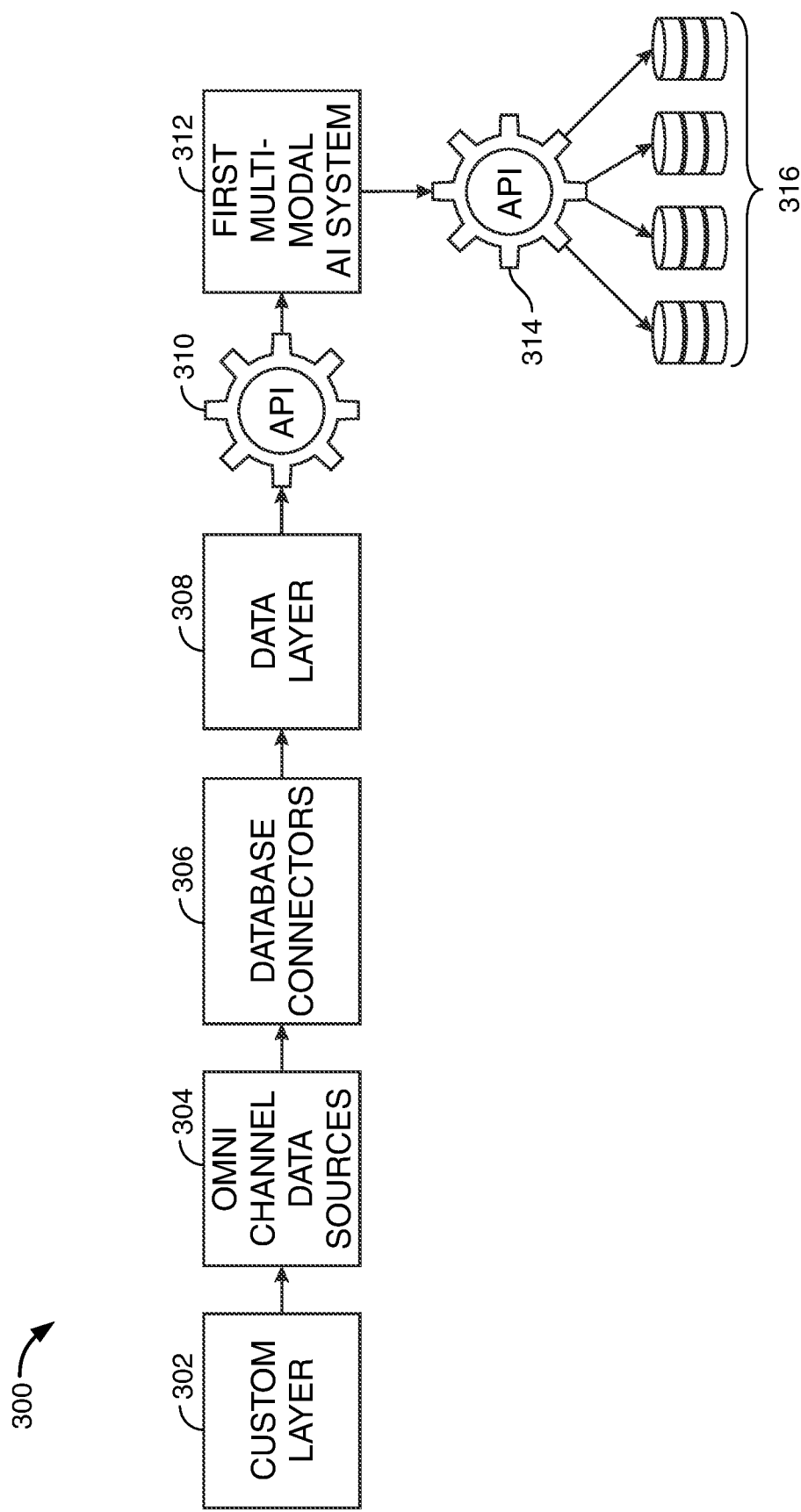
FIG. 3 shows an illustrative process flow in accordance with principles of the disclosure.

FIG. 3 shows process flow 300 for upstream processing of event-driven customer interaction data. At 302, customers may interact with enterprise agents across a variety of channels 304. The interactions may include unstructured data in text-based, audio-based, image-based, or video-based formats. The interactions may include agent responses.

At 306, database connectors may format the data for storage in data layer 308. API 310 may extract interaction data from the data layer for input to first multi-modal AI system 312. First multi-modal AI system 312 may learn to understand and classify the data. Multi-modal AI system 312 may output classified customer interaction data. API 314 may route the output to a set of decentralized streaming caches 316.

Figure 4:
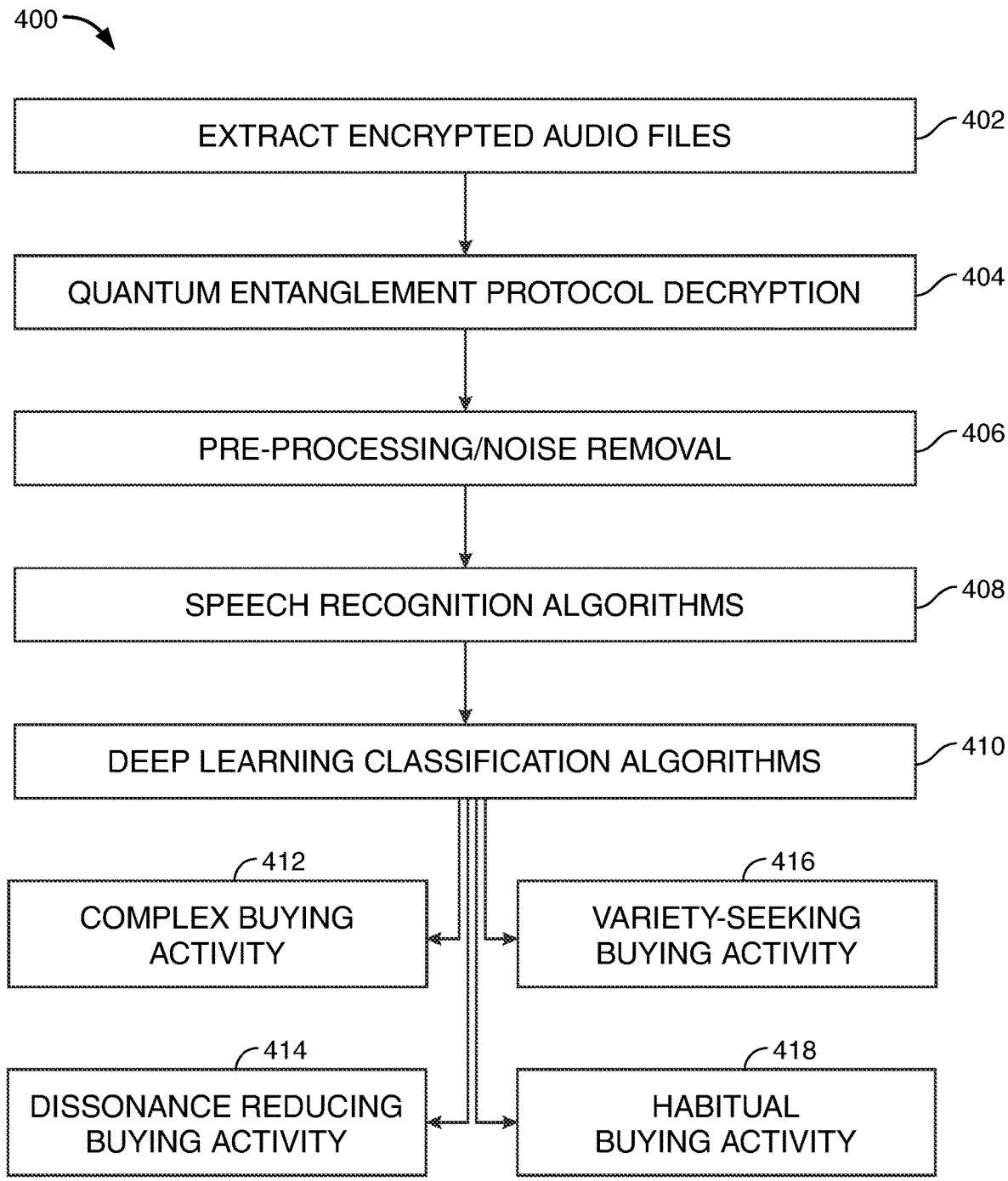
FIG. 4 shows an illustrative process flow in accordance with principles of the disclosure.

FIG. 4 shows process flow 400 for processing customer interaction data. Process flow 400 involves an illustrative audio file, but the system may process data in a range of formats including images, text, and video.

At step 402, the system may extract an encrypted audio file that has been secured in the data layer. The file may be secured using a quantum entanglement protocol such as quantum key distribution. At step 404, the audio file is decrypted according to the quantum entanglement protocol.

At step 406, the system may perform pre-processing on the audio file to reduce noise. At step 408, a multi-modal AI framework may apply a speech recognition algorithm to understand the audio recording. The algorithm may be a self-learning model for cross-lingual speech representation learning such as the XLS-R model. XLS-R is a self-supervised, cross-lingual model that performs speech recognition, speech translation, and language identification. A connectionist temporal classification algorithm may also be applied to further refine the speech recognition.

At step 410, deep learning algorithms may segment the customer interactions based on the type of buying activity involved. Illustrative types of buying activity shown include complex buying activity 412, dissonance-reducing buying activity 414, variety-seeking buying activity 416, and habitual buying activity 418.

Figure 5:
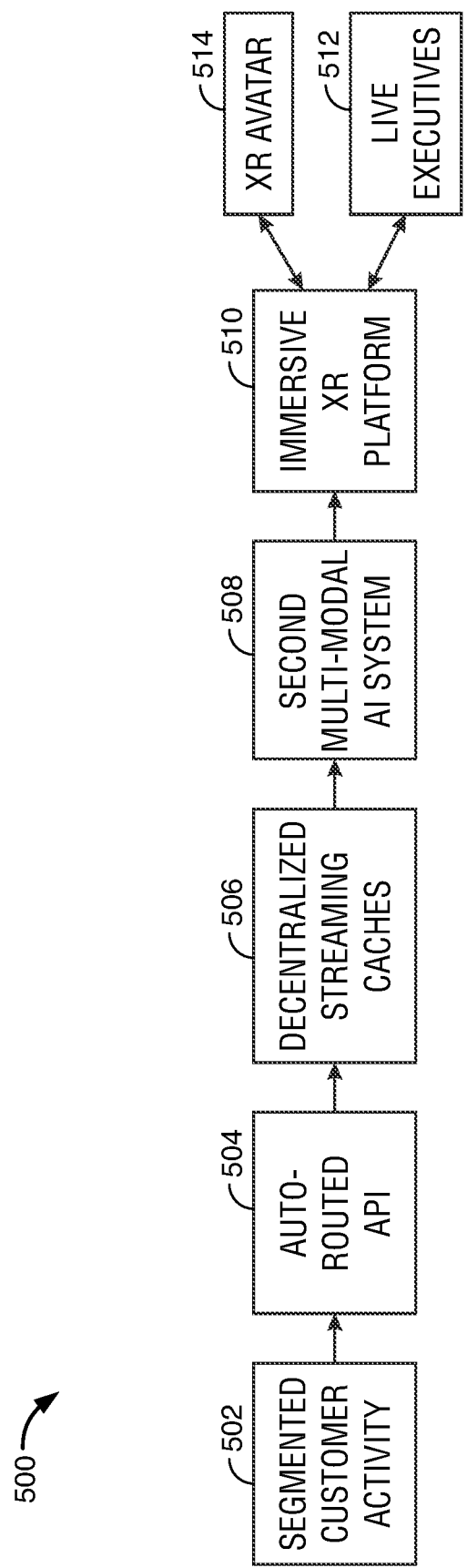
FIG. 5 shows an illustrative process flow in accordance with principles of the disclosure.

FIG. 5 shows process flow 500 for using the upstream data from process flow 300, shown in FIG. 3 and process flow 400, shown in FIG. 4. The first multi-modal AI model may output segmented customer activity data 502. Auto-routed API 504 may route the data to decentralized streaming caches 506. The data may serve as inputs for second multi-modal AI system 508. Second multi-modal AI system 508 may generate video for viewing by executives 512 at immersive XR platform 510. A 3D-GAN may generate an XR avatar. The XR avatar may interact with the video and with executives 512 in an XR environment hosted by platform 510.

Figure 6:
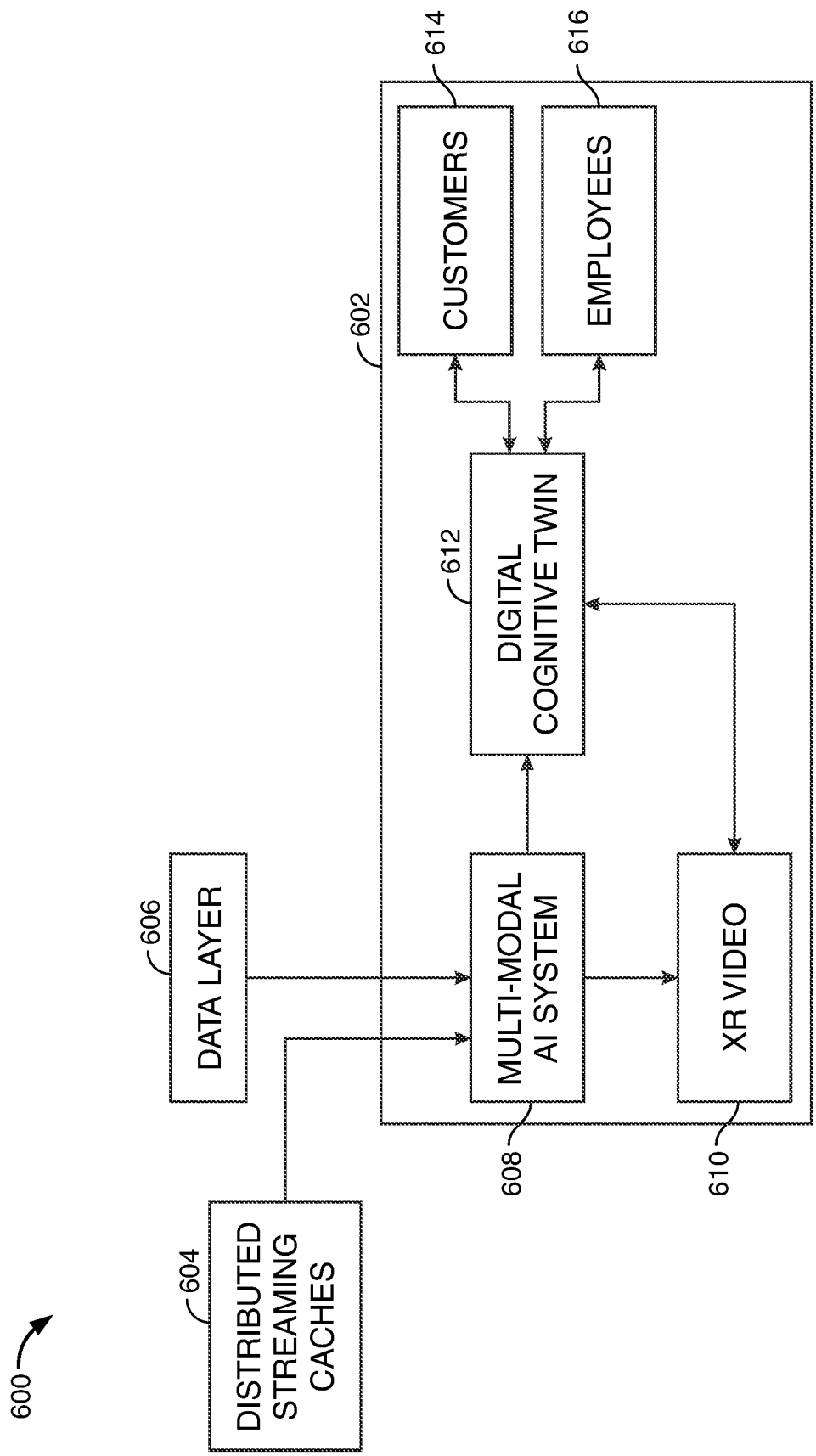
FIG. 6 shows an illustrative process flow in accordance with principles of the disclosure.

FIG. 6 shows process flow 600 for metaverse platform plug-in application 602. An API may route segmented customer activity data from distributed streaming caches 604 to multi-modal AI system 608. Database connectors may move customer communications from data layer 606 to multi-modal AI system 608. Multi-modal AI system 608 may use a text-to-image model to generate XR video 610 from the customer communication and the customer activity data. Multi-modal AI system 608 may generate digital cognitive twin 612 capable of determining solutions associated with a customer input. Digital cognitive twin 612 may be an XR avatar. Digital cognitive twin 612 may present a solution to customer 614. Digital cognitive twin 612 may advise an employee 616 based on the solution.

Thus, methods and apparatus for a METAVERSE ENABLED DIGITAL COGNITIVE TWIN are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for generating a metaverse enabled digital twin using a set of multi-modal artificial intelligence (AI) systems, the method comprising:
    mapping a set of customer communications comprising unstructured data from customers at a plurality of different enterprise channels to a unified format at a data layer comprising multi-cloud object storage;
    at a first multi-modal AI system, classifying patterns of customer interactions across the enterprise channels based on input of the set of customer communications from the data layer, and outputting segmented customer activity data to a plurality of decentralized streaming caches;
    at an extended reality (XR) platform plugin comprising a second multi-modal AI system, the plugin configured to adapt the XR platform:
        at a text-to-image model, generating a video based on the segmented customer activity data from the decentralized streaming caches and input from an enterprise agent for viewing in an XR environment; and
        at a generative adversarial network, training an XR avatar based at least in part on the customer communications, the XR avatar configured to:
            identify a problem associated with a real-time customer input;
            present the video to the customer in the XR environment, the video comprising a solution associated with the problem; and
            present customized commentary to the video to the customer viewing the video in the XR environment, the commentary comprising identifying an element of the video associated with the solution.

2. The media of claim 1, the XR avatar further configured to:
    present the video to an enterprise executive in the XR environment; and
    present a business plan to the enterprise executive, the business plan based at least in part on the video.

3. The media of claim 2, the XR avatar further configured to combine two or more videos for viewing by the enterprise executive in the XR environment.

4. The media of claim 1, the segmented customer activity data comprising segments associated with complex buying activity, dissonance-reducing buying activity, variety seeking buying activity, and habitual buying activity.

5. The media of claim 1, the method further comprising:
    using a first application programming interface (API), extracting customer communications from the data layer for input to the first multi-modal AI system; and
    using a second API, extracting segmented customer activity data from the streaming caches for input to the second multi-modal AI system.

6. The media of claim 1, the data layer preparing an input to the first multi-modal AI model, the preparation preparing comprising:
    decrypting an audio file associated with a customer communication, the audio file encrypted using a quantum entanglement protocol; and
    pre-processing the audio file to reduce noise.

7. The media of claim 1, wherein the immersive video and the XR avatar are generated at a plug-in application configured to interact with a plurality of XR platforms.

8. The media of claim 1, the customer communications comprising unstructured data from an omnichannel framework in text, audio, and video formats.

9. The media of claim 1, wherein the first multi-modal AI system and the second multi-modal AI system each combine deep learning solutions comprising natural language processing, image recognition, and machine learning based classification.

10. A method for generating a metaverse enabled digital twin using a set of multi-modal artificial intelligence (AI) systems, the method comprising:
    mapping customer communications comprising unstructured data from a plurality of different enterprise channels to a unified format at a data layer comprising multi-cloud object storage;
    at a first processor, using a first multi-modal AI system, generating segmented customer activity data comprising classified patterns of customer interactions across the enterprise channels from the customer communications and outputting the segmented customer activity data to a plurality of decentralized streaming caches;
    at a second processor running an extended reality platform, using a plugin comprising a second multi-modal AI system:
        at a text-to-video model, generating a video from the segmented customer activity data and input from an enterprise agent for viewing in an XR environment; and
        at a three-dimensional generative adversarial network, training an XR avatar based at least in part on the customer communications, the XR avatar configured to:
            identify a problem associated with a real-time customer input;
            present the video to the customer in the XR environment, the video comprising a solution associated with the problem; and
            present customized commentary to the video to the customer viewing the video in the XR environment, the commentary comprising identifying a section of the video associated with the solution.

11. The method of claim 10, the XR avatar further configured to:

present the video to an enterprise executive in the XR environment; and present a business plan to the enterprise executive, the business plan based at least in part on the video.

12. The method of claim 10, the data layer preparing an input to the first multi-modal AI model, the preparing comprising:

decrypting an audio file associated with a customer communication, the audio file encrypted using a quantum entanglement protocol; and pre-processing the audio file to reduce noise.

13. The method of claim 10, wherein the video and the XR avatar are generated at a plug-in application configured to interface with a variety of XR platforms.

14. The method of claim 10, the customer interaction data comprising unstructured data from an omnichannel framework in text, audio, and video formats.

15. A system for using multi-modal artificial intelligence (AI) systems to generate a digital cognitive twin by training an XR avatar for an immersive video at an extended reality platform, the system comprising:

a data layer mapping unstructured customer communications at enterprise channels to a unified format in multi-cloud object storage;

a first processor comprising a first multi-modal AI system classifying patterns of interactions from the customer communications and outputting segmented customer activity data to a plurality of decentralized streaming caches;

a second processor running an extended reality platform plugin comprising a second multi-modal AI system configured to:

using a text-to-image model, generate a video from the segmented customer activity data from the decentralized streaming caches and input from an enterprise agent for viewing in an XR environment; and using a three-dimensional generative adversarial network, train an XR avatar based at least in part on the customer communications, the XR avatar:

identifying a problem associated with a real-time customer input;

presenting the video to the customer in the XR environment, the video comprising a solution associated with the problem; and presenting customized commentary supplementing the video to the customer viewing the video in the XR environment, the commentary comprising identifying a section of the video associated with the solution.

16. The system of claim 15, the XR avatar further configured to:

present the video to an enterprise executive in the XR environment; and present a business plan to the enterprise executive, the business plan based at least in part on the video.

17. The system of claim 15, further comprising:

a first application programming interface (API) configured to extract customer communications from the data layer for input to the first multi-modal AI system; and a second API configured to extract segmented customer activity data from the streaming caches for input to the second multi-modal AI system.

18. The system of claim 15, the data layer preparing an input to the first multi-modal AI model, the preparing comprising:

decrypting an audio file associated with a customer interaction, the audio file encrypted using a quantum entanglement protocol; and pre-processing the audio file to reduce noise.

19. The system of claim 15, wherein the video and the XR avatar are generated at a plug-in application configured to interact with a variety of XR platforms.

20. The system of claim 15, the customer communications comprising unstructured data from an omnichannel framework in text, audio, and video formats.

* * * * *